No. 842,774. PATENTED JAN. 29, 1907.
W. H. EICHELBERGER.
AIR BRAKE SYSTEM.
APPLICATION FILED OCT. 10, 1905.
2 SHEETS—SHEET 1.
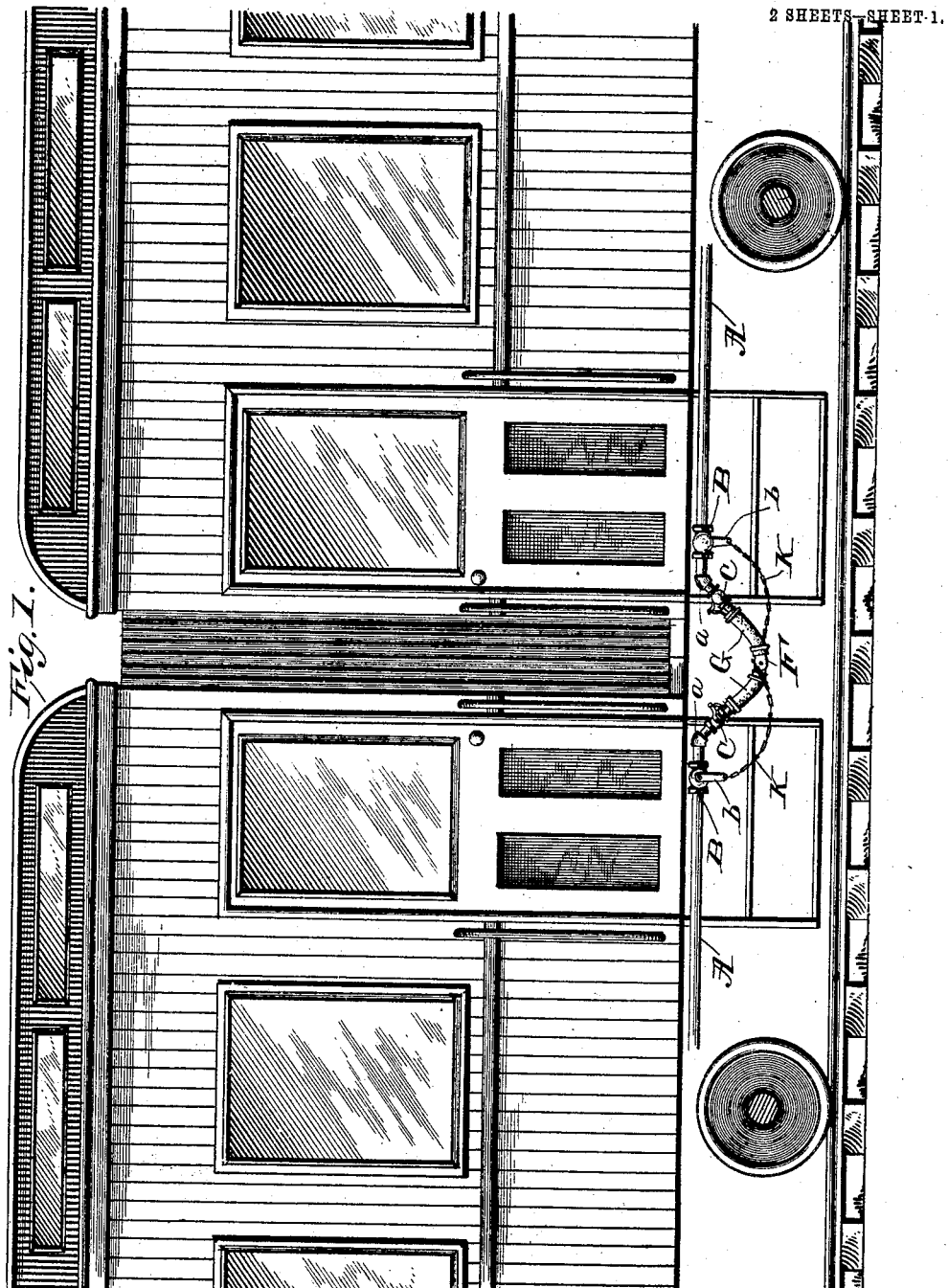
WITNESSES:
INVENTOR
WILLIAM H. EICHELBERGER
BY
ATTORNEYS No. 842,774. PATENTED JAN. 29, 1907.
W. H. EICHELBERGER.
AIR BRAKE SYSTEM.
APPLICATION FILED OCT. 10, 1905.
2 SHEETS—SHEET 2.
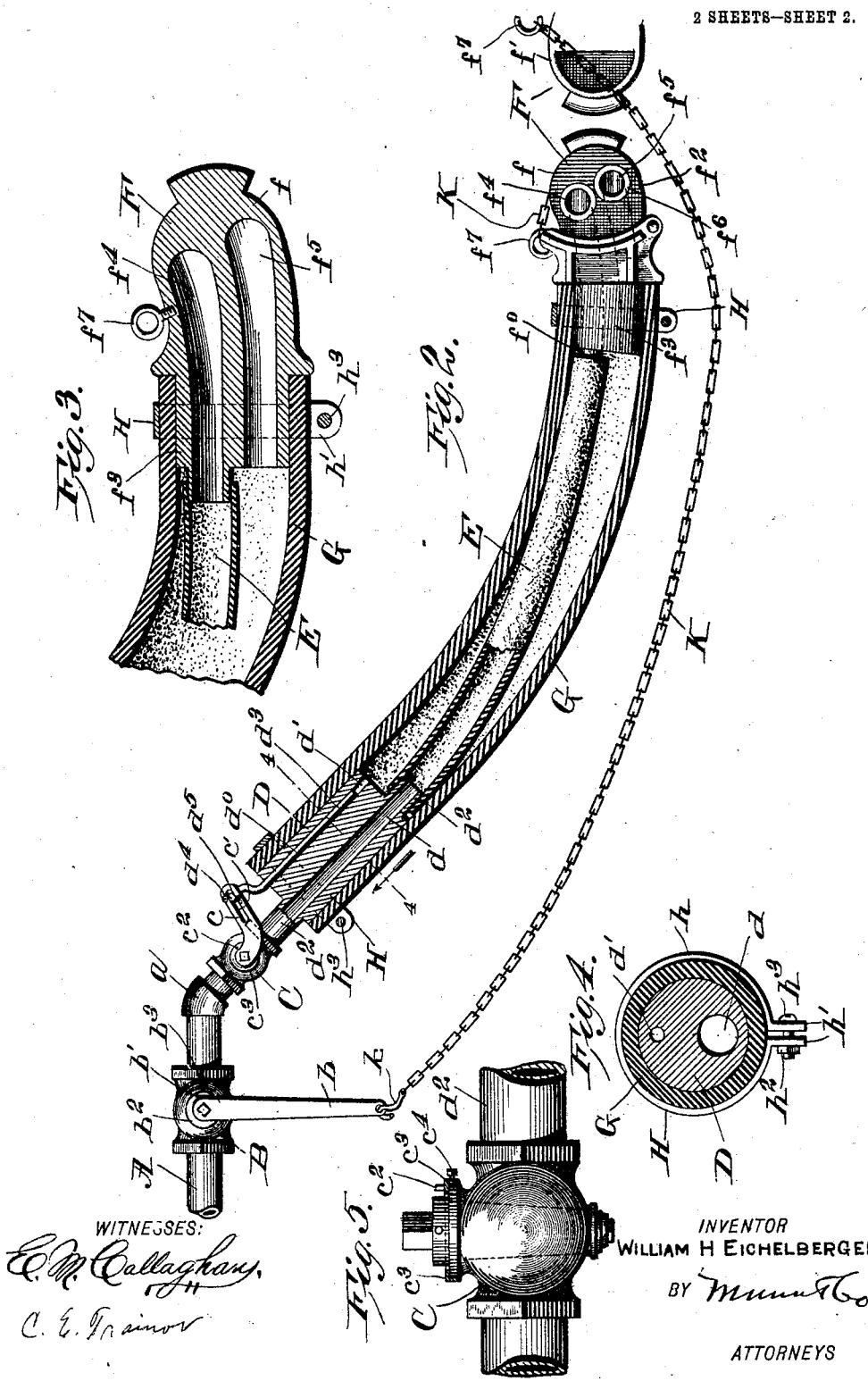
WITNESSES:
E. M. Callaghan
C. E. Trainor
INVENTOR
WILLIAM H EICHELBERGER
BY Munn & Co.
ATTORNEYS
THE NORRIS PETERS CO., WASHINGTON, D. C.

UNITED STATES PATENT OFFICE.

WILLIAM H. EICHELBERGER, OF ROYALTON, PENNSYLVANIA, ASSIGNOR OF ONE-HALF TO MILLARD F. MEINSLER, OF MIDDLETOWN, PENNSYLVANIA.

AIR-BRAKE SYSTEM.

No. 842,774.      Specification of Letters Patent.      Patented Jan. 29, 1907.

Application filed October 10, 1905. Serial No. 282,143.

*To all whom it may concern:*

Be it known that I, WILLIAM H. EICHELBERGER, a citizen of the United States, and a resident of Royalton, in the county of Dauphin and State of Pennsylvania, have invented certain new and useful Improvements in Air-Braking Systems, of which the following is a specification.

My invention is an improvement in air-braking systems, and consists in certain novel constructions and combinations of parts hereinafter described and claimed.

Referring to the drawings forming a part hereof, Figure 1 is a side elevation of a part of a railroad-train provided with my improvement. Fig. 2 is a detail, partly in section, of the connecting-hose for one of the train-pipe sections. Fig. 3 is an enlarged sectional view of one of the sections of the separable coupling and attached parts. Fig. 4 is a section on the line 4 4 of Fig. 2. Fig. 5 is a detail of the valve C, showing the adjustable stop for the valve-lever.

In the practical application of my invention each of the ends of the sections of train-pipe A is provided with the usual valve B and with an elbow $a$ for the attachment of the connecting-hose, and interposed between the hose and elbow is a second valve C and mechanism for automatically closing the same under certain conditions.

The valve B is of ordinary construction and is provided with an operating-lever $b$, whose movement in one direction is limited by a stop $b'$ upon a ring $b^2$, rotatable upon the valve-casing and retained in its adjusted position by means of a set-screw $b^3$. The valve C is also of ordinary construction and is provided with an operating-lever $c$, having longitudinally thereof the slot $c'$ for a purpose to be hereafter described. The movement of the lever in one direction is limited by the stop $c^2$ on a ring $c^3$, rotatable upon the valve-casing and retained in its adjusted position by the set-screw $c^4$.

Connected with the second valve C is a cylinder D, having longitudinally thereof a plurality of perforations $d$ $d'$. One of the perforations $d$ is of relatively large diameter, and the ends of the cylinder are provided with nipples $d^2$ at the openings of the perforations, one of the nipples affording attachment for the valve C and the other for the hose E.

The perforation $d'$ is of relatively small diameter, and within the perforation is a piston $d^3$, having a piston-rod $d^0$, provided on its outer end with a pin $d^4$, engaging the slot $c'$ of the lever C and secured therein by a cotter-pin $d^5$. During ordinary conditions of the air-braking system both of the valves B and C are open, the valve C being arranged to be closed by the outward movement of the piston $d^3$.

The hose E is attached at its outer end to a nipple $f^0$ on a coupling F, comprising a plurality of separable interlocking sections $f f'$, each of the sections comprising a coupling portions proper, $f^2$, and a cylindrical portion $f^3$, and longitudinally of the sections is a plurality of perforations $f^4 f^5$, adapted to register with the corresponding perforations in the complementary section. The edges of the perforations on the face of the coupling-sections are provided with gaskets $f^6$ for preventing air leakage between the faces of the sections.

An outer hose G, seated at one end upon the end of the cylinder D and at the other upon the cylindrical portion of the coupling F, incloses the inner hose, the outer hose being retained in position by the clamps H, comprising a split ring $h$, encircling the hose, and provided with lugs $h'$ at its free ends, the lugs being traversed by openings through which passes a bolt $h^2$, engaged by a nut $h^3$. By tightening the nut any desired degree of pressure may be maintained upon the hose ends.

One of the perforations $f^4$ in the coupling communicates with inner hose E by means of the nipple $f^0$, the registering perforations forming a communication between the adjacent sections of the inner hose and the other set of registering perforations forms a communication between the adjacent sections of the outer hose.

A flexible strand K—in the present instance a chain—connects the valve-lever $b$ of the valve B with a ring $f^7$ upon the coupling-section connected to the adjacent section of the train-pipe, the chain being provided with a hook $k$, engaging a perforation in the valve-lever.

In operation under ordinary conditions the valves B and C remain open and unaffected. Should a rupture of the inner hose occur, however, pressure escaping from the inner hose will cause an increase of pressure in the outer hose, thus forcing out the piston $d^3$, and as a consequence operating the lever $c$ to close the valve C. Should the train break in two, the upward movement of the coupling-sections caused by the separation of the train-pipe section will unlock the coupling-sections, thus moving the valve-lever $b$ to close the valve B.

By adjusting the stops $b'$ upon the valve B and $c'$ upon the valve C the extent of movement of the levers may be varied, so that the valves are only partially closed, thus allowing a certain amount of air to escape from a leak in the coupling. This produces a gradual fall of pressure in the train-pipe and consequent gradual setting of the brakes.

It will be evident from the description that my improvement provides a reliable safety attachment for the weakest point of an air-braking system—that is, the coupling between the sections—and that the attachment is operative under any abnormal condition which may be present.

To prevent dragging of the chains when the cars are uncoupled, they may be attached by any suitable means to the free end of the hose.

Having thus described my invention, what I claim as new, and desire to secure by Letters Patent, is—

1. In an air-braking system, the combination with the train-pipe sections, of a normally open valve connected with the ends of the sections, a lever for operating the valve, means for limiting the motion of the lever, a second normally open valve connected with the first valve, a cylinder of relatively large diameter adjacent to the second valve and provided with a plurality of longitudinal perforations therethrough, nipples at the opening of one of the perforations, a pipe connecting the second valve with one of the nipples, a hose of relatively small diameter secured to the other nipple, a piston in the other perforation of the cylinder, a rod connected with the piston, a pin on the rod for engaging the slot of the second valve-lever, a coupling for connecting the free ends of the hose on the adjacent ends of the train-pipe sections, and composed of a plurality of separable sections, each comprising a locking portion and a cylindrical portion, and each having a plurality of perforations longitudinally thereof and registering with the perforations of the other section, one of the perforations forming a communication between the hose of relatively small diameter, a hose of relatively large diameter inclosing the small hose, and having its ends seated on the cylinder and the cylindrical portion of the coupling-section, and a flexible strand connecting the valve-lever of the first valve with the coupling-section of the opposite train-pipe section.

2. In an air-braking system, the combination with a train-pipe section, of normally open valves connected with the ends of the sections, a lever for operating the valves, a cylinder of relatively large diameter adjacent to the valve and provided with a plurality of longitudinal perforations therethrough, nipples at the opening of one of the perforations, a pipe connecting the valve with one of the nipples, a hose of relatively small diameter secured to the other nipple, a piston in the other perforation of the cylinder, a rod connecting the piston with the valve-lever, a coupling connecting the free ends of the hose on the adjacent ends of the train-pipe sections, and provided with a plurality of perforations longitudinally thereof, one of said perforations forming a communication between the adjacent sections of the small hose, and a hose of relatively large diameter inclosing the small hose.

3. In an air-braking system, the combination with the train-pipe composed of a plurality of sections, a hose connecting the adjacent ends of the sections, a plurality of normally open valves interposed between the ends of the hose and the section, a second hose inclosing the first hose, means whereby an increase of pressure in the outer hose may close one of the valves, and means connecting the other valve and the opposite train-pipe section, whereby a separation of the sections beyond a predetermined distance may close the valve.

4. In an air-braking system, the combination with the train-pipe sections, of a normally open valve on the ends of the sections, a hose connected with the valves, inclosures for the hose, a coupling for adjacent ends of the hose, comprising a plurality of interlocking sections and having a plurality of longitudinal openings, therethrough, one of the openings connecting the inner hose and the other the inclosures, and means whereby an increase of pressure in the inclosures may partially close the valves.

5. In an air-braking system, the combination with the train-pipe sections, of a normally open valve in the ends of the sections, a hose connected with the valves, an inclosure for the hose, a coupling for the adjacent ends of the inner hose, comprising a plurality of interlocking sections, and having a plurality of longitudinal openings therethrough, one of the openings connecting the inner hose and the other the inclosures, means whereby an increase in pressure in the inclosure may partially close the valve, and means whereby to regulate the extent of said closure.

6. In an air-braking system, the combination with the train-pipe sections, of a flexible hose connecting the adjacent sections, a valve at the inner end of the hose, a second hose inclosing the first hose, and means whereby an increase in pressure in the outer hose may partially close the valve.

7. In an air-braking system, the combination with the train-pipe sections, of a flexible hose connecting the adjacent sections, a valve at the inner end of the hose, a second hose inclosing the first hose, means whereby an increase in pressure in the outer hose may partially close the valves, and means whereby to regulate the extent of the closure of the valves.

8. In an air-braking system, the combination of the train-pipe sections, normally open valves on the ends of the sections, a pipe connecting the valves, an inclosure for the pipe, means whereby an increase of pressure within the inclosure may partially close the valves, and means whereby to regulate the extent of closure of the valves.

9. In an air-braking system, the combination with the train-pipe sections, of a flexible pipe connecting the sections, an inclosure for the flexible pipe, means whereby an increase in pressure in the inclosure may partially close the communication between the train-pipe sections and the flexible pipe, and means whereby to regulate the extent of the closure.

10. In an air-braking system, the combination with the train-pipe sections, of a flexible pipe connecting the sections, inclosures for the flexible pipe, means whereby an increase of pressure in the inclosure may close the communication between the train-pipe sections and the flexible pipe, and means whereby the separation of the train-pipe sections beyond a predetermined extent may close said communication.

11. In an air-braking system, the combination with the train-pipe sections, of a flexible pipe connecting the sections, an inclosure for the flexible pipe, means whereby an increase in pressure in the inclosure may partially close the communication between the train-pipe sections and the flexible pipe, means whereby the separation of the train-pipe sections beyond a predetermined extent may partially close said communication, and means whereby to regulate the extent of said inclosure.

12. In an air-braking system, the combination with the train-pipe sections, of a flexible pipe connecting the sections, an inclosure for the flexible pipe, a plurality of normally open valves at the ends of the sections, means whereby an increase of pressure in the inclosure may close one of said valves, and means whereby the separation of the train-pipe sections beyond a predetermined extent may close the other of said valves.

13. In an air-braking system, the combination with the train-pipe sections, of a flexible pipe connecting the sections, an inclosure for the flexible pipe, a plurality of valves at the ends of the sections, means whereby an increase of pressure in the inclosure may partially close one of said valves, means whereby the separation of the train-pipe sections beyond a predetermined extent may partially close the other valve, and means whereby to regulate the extent of closing of each of the valves.

14. In an air-braking system, the combination with the train-pipe sections, of a flexible pipe connecting the sections, an inclosure for the flexible pipe, a plurality of valves on the ends of the sections, means whereby an increase of pressure in the inclosure may close one of said valves, and means connected to the opposite train-pipe section for closing the other of said valves.

15. In an air-braking system, the combination with the train-pipe sections, of a hose connecting the sections, means arranged for operation by pressure escaping from said hose, when broken, for closing the train-pipe sections, and auxiliary means actuated by the separation of the train-pipe sections beyond a predetermined distance for closing the train-pipe sections.

16. In an air-braking system the combination with the train-pipe section and a hose connecting the same, of means operated by pressure escaping from the hose when ruptured for closing the train-pipe sections, and auxiliary means operated by the separation of the sections beyond a predetermined distance for closing the same.

WILLIAM H. EICHELBERGER.

Witnesses:
NEWTON C. EICHELBERGER,
EMMA E. PALMER.